United States Patent [19]

Shiroto et al.

[11] Patent Number: 4,530,753
[45] Date of Patent: Jul. 23, 1985

[54] METHOD OF CONVERTING HEAVY HYDROCARBON OILS INTO LIGHT HYDROCARBON OILS

[75] Inventors: Yoshimi Shiroto, Yokohama; Shinichi Nakata, Kawasaki; Hideki Hashimoto, Tokyo, all of Japan

[73] Assignee: Chiyoda Chemical Engineering & Construction Co., Ltd., Yokohama, Japan

[21] Appl. No.: 631,503

[22] Filed: Jul. 16, 1984

Related U.S. Application Data

[63] Continuation of Ser. No. 571,137, Jan. 16, 1984, abandoned, which is a continuation of Ser. No. 338,152, Jan. 8, 1982, abandoned.

[30] Foreign Application Priority Data

Jan. 25, 1981 [JP] Japan .................................. 56-9297

[51] Int. Cl.³ ........................ C10G 65/12; C10G 69/06
[52] U.S. Cl. ........................................ 208/68; 208/97; 208/210; 208/216 PP; 208/251 H; 208/254 H
[58] Field of Search ................ 208/68, 74, 97, 210, 208/216 PP, 251 H, 254 H

[56] References Cited

U.S. PATENT DOCUMENTS

| | | | |
|---|---|---|---|
| 3,271,302 | 9/1966 | Gleim | 208/264 |
| 3,287,254 | 11/1966 | Paterson | 208/68 |
| 3,303,126 | 2/1967 | Gleim | 208/251 H |
| 3,867,282 | 2/1975 | Fischer et al. | 208/216 R |
| 3,907,668 | 9/1975 | Christman et al. | 208/216 PP |
| 3,954,673 | 5/1976 | Morimoto | 252/465 |
| 4,008,149 | 2/1977 | Itoh et al. | 208/216 PP |
| 4,017,379 | 4/1977 | Iida et al. | 208/68 |
| 4,152,250 | 5/1979 | Inooka et al. | 208/251 H |
| 4,166,026 | 8/1979 | Fukui et al. | 208/210 |
| 4,306,964 | 12/1981 | Angevine | 208/210 |
| 4,326,991 | 4/1982 | Asaoka et al. | 252/432 |

Primary Examiner—D. E. Gantz
Assistant Examiner—O. Chaudhuri
Attorney, Agent, or Firm—Armstrong, Nikaido, Marmelstein & Kubovcik

[57] ABSTRACT

Heavy hydrocarbon oils are converted into light hydrocarbon oils by two-stage process wherein, in the first stage, a heavy hydrocarbon oil is subjected to thermal cracking conditions and, in the second stage, the product of the thermal cracking is subjected to a hydrotreatment in the presence of a specific catalyst including, as a carrier, a clay mineral consisting mainly of magnesium silicate having a double-chain structure such as sepiolite.

8 Claims, 1 Drawing Figure

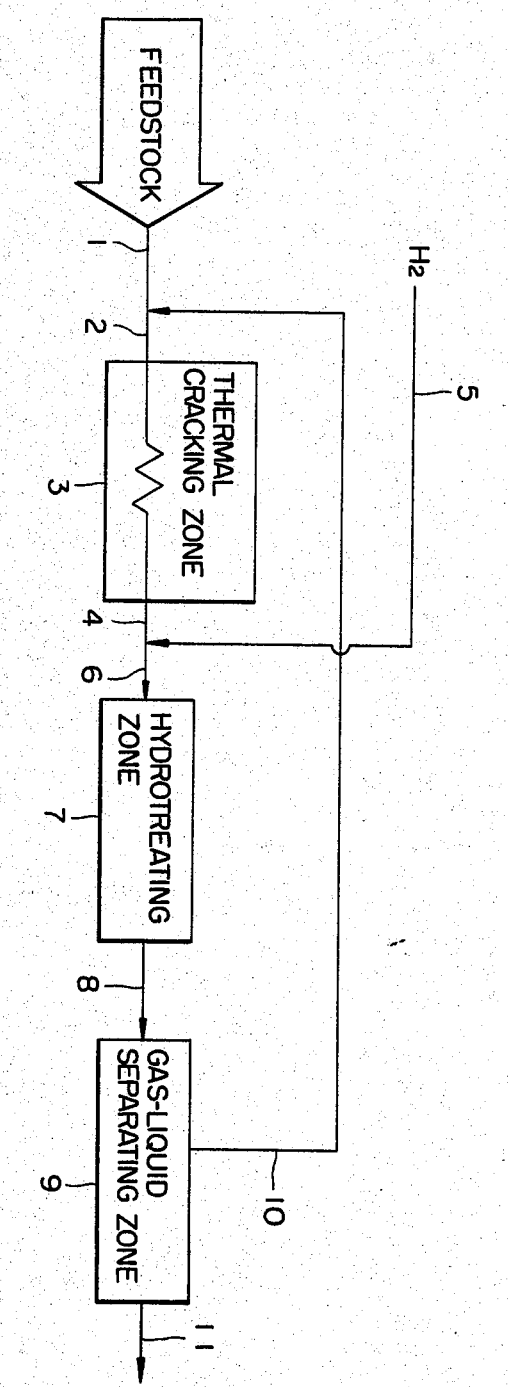

METHOD OF CONVERTING HEAVY HYDROCARBON OILS INTO LIGHT HYDROCARBON OILS

This application is a continuation of application Ser. No. 571,137, filed Jan. 16, 1984, now abandoned which is a continuation of Ser. No. 338,152, filed Jan. 8, 1982, now abandoned.

BACKGROUND OF THE INVENTION

1. Field of the Invention

This invention relates generally to a process for the conversion of heavy hydrocarbon oils into light hydrocarbon oils and, more particularly, to a two-stage process for the conversion of heavy hydrocarbon oils into light hydrocarbon oils wherein, in the first stage, a heavy hydrocarbon oil is subjected to thermal cracking conditions and, in the second stage, the product of the thermal cracking is subjected to a catalytic hydrotreatment.

2. Description of the Prior Art

The heavy hydrocarbon oils to which this invention is applicable include crude oils, reduced crude oils, vacuum residues, heavy oils extracted from tar sand, liquified coal oils and mixtures thereof. These hydrocarbon oils usually contain a large amount of components with a boiling point of 900° F. or more such as asphaltenes, heavy metals, sulfur compounds, nitrogen compounds or the like. The term "asphaltene" used herein means a substance which is insoluble in normal heptane. Such heavy hydrocarbon oils are rich in natural resources, and while they are considered as promising hydrocarbon resources, they are presently used merely for producing extremely low grade fuel oils or asphalt for pavement of roads. In view of the present political and economical situation facing energy crisis due to the depletion of high quality petroleum resources in the near future, it is strongly desired to develop effective processes capable of converting heavy hydrocarbon oils into more useful light hydrocarbon oils. The term "light hydrocarbon oils" used herein means oils having a boiling point of not higher than 900° F.

U.S. Pat. No. 4,017,379 issued to Iida et al proposes a two-stage process for the conversion of a heavy hydrocarbon oil into light hydrocarbon oils, in which, in the first stage, the heavy hydrocarbon oil is subjected to thermal cracking at a temperature of 400°–800° C. under a pressure of 1–200 Kg/cm² and, in the second stage, the product from the first stage as such is subjected to a catalytic hydrotreatment at a temperature of 370°–480° C. and a total pressure of 50–300 Kg/cm². The catalyst used in the hydrotreatment stage is composed of one or more metals selected from Groups VI and VIII metals supported on a γ-alumina carrier. According to this process, a crude oil extracted from tar sand may be converted into light fractions with a yield as high as 98%. This process, however, has been found to involve a problem that the catalyst tends to be poisoned or degraded within relatively short period of time, requiring frequent exchange of the catalyst with fresh one.

SUMMARY OF THE INVENTION

It is, therefore, an object of the present invention to provide a process for the conversion of heavy hydrocarbon oils into light hydrocarbon oils, which can overcome the above-mentioned problem involved in the prior art process.

Another object of the present invention is to provide a process in which the conversion of heavy hydrocarbon oils into light hydrocarbon oils may be continued for a long period of time without necessitating frequent exchange of the catalyst.

In accomplishing the foregoing objects, there is provided in accordance with the present invention a process for the conversion of a heavy hydrocarbon oil into light hydrocarbon oils, comprising subjecting the heavy hydrocarbon oil to thermal cracking conditions, and hydrotreating the product of the thermal cracking in the presence of a catalyst which comprises a porous carrier including a clay mineral consisting mainly of magnesium silicate having a double-chain structure, and one or more catalytic metal components composited with said carrier, the metal of said catalytic metal components being selected from the group consisting of the metals belonging to Groups VB, VIB, VIII and IB of the Periodic Table, said catalytic metal components being present in an amount of between about 0.1% and about 30% in terms of metal oxide based on the total weight of said catalyst.

Preferably, the catalyst has the following characteristics (a)–(d):

(a) an average pore diameter being between about 200 and about 400 Å, (b) a total volume of pores with a pore diameter of 75 Å or more being between about 0.5 and about 1.5 cc/g, the volume of pores with a diameter of not greater than 100 Å being not more than 0.1 cc/g, the volume of pores with a diameter of between about 200 and about 400 Å being at least about 0.2 cc/g, the volume of pores with a diameter of at least 1500 Å being not greater than about 0.03 cc/g, (c) a total surface area of pores with a pore diameter of 75 Å or more being at least about 70 m²/g, (d) an average catalyst diameter being between about 0.6 and about 5 mm.

The present inventors have made an extensive research to investigate the reason for the degradation of the catalyst and have found that toluene insolubles contained in the thermal cracking product account for such catalyst poisoning. The toluene insolubles, which are polycondensed ring aromatics, have a basicity. Since alumina catalysts generally have a high acidity, such toluene insolubles can be adsorbed on the surface of the catalyst, whereby the formation of coke is accelerated. In contrast, the catalyst used in the process of this invention does not have an acidity and can exhibit its activity for a long process time.

The term "toluene insolubles" used herein means hydrocarbon components which are insoluble in toluene. The percentages of toluene insolubles are determined by toluene extraction at 80° C. in accordance with UOP Method 614-80.

BRIEF DESCRIPTION OF THE DRAWING

Other objects, features and advantages of the present invention will become apparent from the detailed description of the invention which follows, when considered in light of the accompanying drawings in which the sole FIGURE is a flow diagram showing one embodiment of the present invention.

BRIEF DESCRIPTION OF THE INVENTION

Heavy hydrocarbon oils which can be effectively treated by the process of the present invention are highly viscous, high-asphaltene oils having a specific gravity (API) of less than about 20° and containing at least about 10 vol %, especially over about 20 vol % of fractions having a boiling point of at least 900° F. Table 1 shows the properties of typical heavy hydrocarbon oils. In the table, the letters A to C indicate the following oils:
A: Boscan crude oil
B: Khafji vacuum residue
C: Canadian oil sand bitumen

TABLE 1

|  | A | B | C |
| --- | --- | --- | --- |
| Gravity (°PI) | 9.4 | 11.2 | 9.6 |
| Viscosity (50° C., cp) | 4950 | 3200 | 3100 |
| n-Heptane insolubles (wt %) | 11.9 | 8.6 | 7.7 |
| Vol. % of 900° F.+ fraction | 60 | 70 | 55 |
| Ni content (wt-ppm) | 112 | 33 | 78 |
| V content (wt-ppm) | 1190 | 100 | 190 |

According to the process of this invention, the heavy hydrocarbon feedstock is first introduced into a heat treating zone where it is subjected to thermal cracking conditions. The thermal cracking is performed at a temperature of 400°–530° C., preferably 430°–500° C. and a pressure of 0–200 Kg/cm$^2$G, preferably 5–180 Kg/cm$^2$G with a residence time of 1–300 min., preferably 10–120 min. The term "residence time" used herein means a value obtained by dividing the inside volume of the reactor for the thermal cracking by the flow rate of the feedstock oil therethrough (calculated on 60° F. basis).

A temperature of the thermal cracking below 400° C. is insufficient to effect the cracking of the heavy hydrocarbon oil to a desired degree within a practically acceptable period of time. Above 530° C., it becomes difficult to control the thermal cracking and, moreover, polycondensation of pitch can proceed very fast, yielding a large amount of coke which cannot be decomposed in the subsequent hydrotreatment.

The pressure at which the thermal cracking is performed is one of the very important factor in minimizing the occurence of undesirable side reactions such as polycondensation, gasification and coking. The higher the pressure, the lower becomes the yield of gaseous products and, thus, desirable liquid products such as gasoline and kerosene can be obtained with a better yield. Further, the higher the pressure, the greater becomes the amount of the feed oil which is present in the liquid state within the reactor. This is advantageous because heat transfer within the reactor may be facilitated and local superheat can be prevented, whereby the formation of coke may be reduced. From the standpoint of equilibrium, however, an increase in pressure of the thermal cracking is not advantageous. Therefore, the optimum pressure is determined in consideration of the properties of the heavy hydrocarbon oil to be treated, cracking temperature or the like. Generally, the thermal cracking is carried out at a pressure in the range of 0–200 Kg/cm$^2$G.

In order to reduce the formation of coke, it is preferred that the thermal cracking be carried out in the presence of a gaseous medium such as steam, a hydrogen gas or a nitrogen gas. A volatile fraction or fractions obtained in the system may also be used as the gaseous medium. The use of hydrogen is particularly preferable because of the additional advantage that there can proceed thermal hydrocracking in which the formation of coke is significantly minimized.

The residence time depends upon the reaction temperature. The higher the temperature, the shorter should be the residence time. With a residence time of more than 5 hours, there is a danger of the coke formation in a considerable amount.

The thermal cracking may be effected with the use of a coil heater, tubular reactor, chamber-type reactor, drum-type reactor or any other suitable reactors.

The thermal cracking may be carried out in a continuous, two-step manner. In the first step the feedstock is subjected to severe cracking conditions to such an extent as to avoid the clogging of the reactor due to coke formation. With a coil heater, for example, the first step is conducted at a temperature of 450°–530° C. and a pressure of 1–200 Kg/cm$^2$G with a residence time of 1–20 min. The product from the first step is then fed to the second step employing milder cracking conditions than those in the previous step, for example at a temperature of 400°–500° C. and a pressure of 1–200 Kg/cm$^2$G with a residence time of 5–300 min. The second step is preferably performed in the presence of the above-described gaseous medium.

In general, the thermal cracking treatment is conducted so that at least about 15% by volume, preferably at least about 25% by volume of the components of the feedstock oil having a boiling point of at least 900° F. may be decomposed into light hydrocarbon oils having a boiling point of below 900° F.

In the process of the present invention, the product thus obtained in the thermal cracking zone is then introduced into a hydrotreating zone where it is subjected to a hydrotreatment in the presence of a catalyst. If necessary, the product from the thermal cracking zone is rapidly cooled before being introduced into the hydrotreating zone so as to terminate the cracking within the specified range of time. Such rapid cooling may be done either by directly contacting the cracking product with a cooling medium or by means of an indirect-type heat exchanger. The cooling medium may be a hydrogen or nitrogen-rich gas, steam or a gaseous product of the system. The cracking product is generally cooled to a temperature at which the subsequent hydrotreatment is performed. Such a cooling step is unnecessary when the cracking is conducted at a temperature lower than that in the hydrotreating step.

The thus cooled or uncooled product from the cracking zone is introduced into the hydrotreating zone either as such or after the removal of its gaseous components and, if desired, light oil fractions. Whether or not such a removal treatment is to be carried out and what fraction or fractions are to be removed may be determined generally according to the properties of the feedstock oil and intended end product. The separation of the gas and light fractions from the cracking product may be effected by any known ways, for example, by means of a flash drum or by distillation.

The hydrotreatment of the cracking product is carried out in the presence of a specific catalyst. The catalyst is comprised of a porous carrier including a clay mineral consisting mainly of magnesium silicate having a double-chain structure. Suitable examples of the clay mineral are naturally available sepiolite, attapulgite and palygorskite. These clay minerals have a crystal form of the double-chain structure as shown in The Handbook of Clays (1967) compiled by The Japanese Society of Clays, page 48. They have a double-chain lattice structure which is basically a chain structure similar to that of amphibole, as opposed to the other clay minerals having a layer lattice structure. The crystals of these clay minerals have a fibrous or tubular form which is suitable for providing the catalyst having desired specific physical properties.

The carrier for the hydrotreating catalyst may be a composite carrier composed of the above-described clay mineral consisting mainly of magnesium silicate having a double-chain structure and an inorganic oxide or oxides of at least one element selected from among the elements belonging to Groups II, III and IV of the Periodic Table.

One or more catalytic metal components are composited with the carrier. The metal of the catalytic metal components is selected from among the metals belonging to Groups VB, VIB, VIII and IB of the Periodic Table, most preferably vanadium, molybdenum, tungsten, chromium, cobalt, nickel or copper. These catalytic metal components can be effectively used, whether in the form of a metal, metal oxide or metal sulfide, or alternatively, they may be partially combined with the carrier material by ion exchange or otherwise. The catalytic metal component should be present in the range of about 0.1% to about 30% by weight in terms of oxide based on the total weight of the catalyst.

The "Periodic Table" as herein referred to is one which appears on page 628 of Webster's 7th New Collegiate Dictionary, G & C Merriam Company, Springfield, Mass., U.S.A. (1965).

These catalytic metal components dictate the activity of the catalyst for various reactions involved in the hydrotreatment of the product of the thermal cracking, such as hydrogenation, hydrogenolytic decomposition, demetallization, desulfurization and denitrification.

In addition to the problem of catalyst poisoning, the prior art process disclosed in U.S. Pat. No 4,017,379 has been found to involve a problem that the hydrotreated product is not stable so that a sludge is formed during transportation or storage. Therefore, when such a product is subjected to a further refining treatment, for example, the wall surfaces of the apparatus are apt to be fouled. In addition, the product oil has been found to be poor in compatibility. Thus, the oil tends to separate into layers during storage. Poor compatibility also makes it difficult to blend the oil product with other hydrocarbon oils.

The present invention has also solved this problem. Thus, in a preferred aspect of the present invention, the hydrotreating stage is conducted using the catalyst of the above-mentioned type and having the following properties (a)-(d):

(a) an average pore diameter being between about 200 and 400 Å;

(b) a total volume of pores with a pore diameter of 75Å or more being between about 0.5 and about 1.5 cc/g, the volume of pores with a diameter of not greater than 100 Å being not more than 0.1 cc/g, the volume of pores with a diameter of between about 200 and about 400 Å being at least about 0.2 cc/g, the volume of pores with a diameter of at least 1500 Å being not greater than about 0.03 cc/g;

(c) a total surface area of pores with a pore diameter of 75 Å or more being at least about 70 m²/g;

(d) an average catalyst diameter being between about 0.6 and about 5 mm.

The present inventors have found that the toluene insoluble content in a hydrotreated oil is closely related to its stability and that it is essential to maintain the toluene insoluble content below 0.5% by weight in order for the hydrotreated oil to have desirable stability. It has also been found that the toluene insoluble content depends upon the catalyst used in the hydrotreatment of the thermally cracked product. The catalyst used in the process of the above-described U.S. Pat. No. 4,017,379 patent is composed of one or more metals selected from Groups VI and VIII metals supported on a γ-alumina carrier. The U.S. patent suggests the desirability of the use of a carrier with an average pore diameter of between 120 and 160 Å. So far as such a catalyst is used for hydrotreating virgin heavy hydrocarbon oils, there arises no problem of unstability of the hydrotreated product. However, such a catalyst, when used for hydrotreating a product of thermal cracking of a heavy hydrocarbon oil, is not effective enough to yield a stable, hydrotreated hydrocarbon oil having a sufficiently low content of toluene insoluble matters. As disclosed in the U.S. patent, thermal cracking of a heavy hydrocarbon oil can increase the amount of asphaltenes, but the asphaltenes in the thermally cracked product differ in quality from those in the oil prior to the thermal cracking; i.e. the asphaltenes after thermal cracking have much lower molecular weight than those before the cracking. From this point of view, it is resonable to conceive that a catalyst formed of a carrier with an average pore diameter of 120-160 Å may achieve the desired rate of conversion into light hydrocarbon oils. However, it has been unexpectedly found that the use of a catalyst having a large average pore diameter is essential to obtain stable hydrocarbon oils through catalytic hydrotreatment of a product oil from thermal cracking. When the catalyst used in the process of the present invention has the above-defined specific properties, it is possible to reduce the toluene insoluble content in the hydrotreated oil product to the extent that it can withstand storage for a long period of time.

For the purpose of this specification, the value of the average pore diameter, APD, is defined by the following formula, and expressed in Å:

$$APD = \frac{4 \times PV \times 10^4}{SA} \quad (1)$$

wherein PV and SA represent the total pore volume and total surface area, respectively, of the pores having a diameter of 75 Å or more, per unit catalyst weight, which are expressed in cc/g and m²/g, respectively. The total pore volume and the total surface area of the pores having a diameter of at least 75 Å, per gram of the catalyst will hereinafter be referred to simply as the pore volume and the surface area, respectively, of the catalyst, unless otherwise noted.

The pore diameter, pore volume and surface area of the catalyst were determined by the mercury penetration method [of which details are described in, for example, E. W. Washburn, Proc. Natl. Acad. Sci., 7, page 115 (1921), H. L. Ritter and L. E. Drake, Ind. Eng. Chem. Anal., 17, pages 782 and 787 (1945), L. C. Drake, Ind. Eng. Chem., 41, page 780 (1949), and H. P. Grace, J. Amer. Inst. Chem. Engrs., 2, page 307 (1956)] using a mercury penetration porosimeter, Model 70 (made by Carlo Elba of Milano, Italy). The determination was made with a mercury surface tension of 474 dyne/cm at 25° C., a contact angle of 140° and an absolute mercury pressure which was varied between 1 and 2,000 Kg/cm². The diameter of the pores having a diameter of at least 75 Å can be expressed by the following formula:

$$\text{Pore diameter (Å)} = \frac{150,000}{\text{Absolute mercury pressure (Kg/cm}^2\text{)}}$$

The average catalyst diameter, ACD, of the catalyst particles according to this invention is defined by the following formula, and expressed in millimeter:

$$ACD = 6 \times \frac{\text{Average volume of catalyst particles (mm}^3\text{)}}{\text{Average outer surface area of catalyst particles (mm}^2\text{)}} \quad (2)$$

In this formula, the average volume and average outer surface area of the catalyst particles represent the volume and outer surface area, respectively, of a spherical equivalent having a diameter which is equal to the average particle diameter of the catalyst which is determined by direct measurement, as specifically set forth in "Particle Size Determination", Powder Engineering Society, Nikkan Kogyo Shinbunsha (1975).

Toluene insolubles are highly polycondensed, high molecular hydrocarbons formed in the thermal cracking stage by, for example, thermal polycondensation of high molecular hydrocarbons such as asphaltenes. The content of toluene insolubles in a hydrotreated oil is found to serve as an index for evaluating the quality thereof. Hydrotreated oils having significantly improved thermal stability and compatibility can be obtained by controlling the toluene insoluble content to a level not exceeding 0.5 wt %. Thus, in case where such a stable product oil is to be obtained, it is advisable to conduct the hydrotreatment in the presence of the catalyst having the above-described specific properties so that the resulting hydrotreated oil may have a toluene insoluble content of not greater than 0.5 wt %, preferably not greater than 0.15 wt %, more preferably not greater than 0.04 wt %.

The catalyst with an average pore diameter of 200–400 Å is very suited for hydrotreating the thermal cracking product so as to obtain a stable and good quality oil product having a toluene insoluble content of 0.5 wt % or less. In this case, the volume of pores with a pore diameter of less than about 100 Å should not be greater than 0.1 cc/g and is preferably not greater than 0.08 cc/g. The catalyst can be used with a higher degree of efficiency with a greater pore volume defined by pores having a diameter in the range of about 200 and about 400 Å. More specifically, the volume of pores with a diameter of between about 200 and about 400 Å is preferably at least about 0.2 cc/g, more preferably at least about 0.3 cc/g. In other words, a high catalytic activity for the decomposition of toluene insolubles may be achieved when pores having a diameter of about 200–400 Å occupy the major portion of the total pore volume, PV. It is preferred that the catalyst have a surface area, SA, of at least about 70 m²/g in order to provide a desired catalytic activity.

It is known that the size of the catalyst particles is generally a very important factor in the reactions in which intrapore diffusion prevails (for details, see P. H. Emmett, "CATALYSIS", Vol. II, Reinhold Publishing Corporation, New York (1955), and C. N. Satterfield, "MASS TRANSFER IN HETEROGENEOUS CATALYSIS", M.I.T. Press, Massachusetts (1970)). Too large an average catalyst diameter is generally disadvantageous to provide a satisfactory level of catalytic activity. If the catalyst particles are too small, on the other hand, it after becomes difficult to use them with a fixed, moving or ebullated bed, or other reaction system widely used in the art for the catalytic hydrotreatment of a heavy hydrocarbon oil. For instance, various disadvantages may result from the use of too small catalyst particles with a fixed bed system, including an increased pressure drop in the catalyst bed, pulverization of the catalyst during use, and agglomeration of the particles by deposition of heavy metals and coke. Accordingly, it is preferred that the catalyst have a particle size of about 0.6 and about 5 mm in terms of average catalyst diameter.

One of the important requirements which an optimum catalyst must satisfy from the standpoint of industrial use is that it should have a satisfactory level of mechanical strength. The mechanical strength of a molded catalyst is generally expressed by way of its crushing strength and abrasion loss. An optimum catalyst having a suitable level of mechanical strength, especially crushing strength, has been found to require a total pore volume, PV, of 0.5–1.5 cc/g. The total pore volume of in such a range is also preferable in order for the catalyst to maintain its catalytic activity for a sufficiently long period steadily.

A catalyst is imparted with an extremely large abrasion loss, if its pores having a diameter of at least 1,500 Å have a large pore volume in total. In order to reduce the abrasion loss to a desirable level, it is preferable to decrease the pores having a diameter of at least 1,500 Å to the extent that their total volume may be reduced to a level not greater than about 0.03 cc/g. Macropores having a diameter of at least 1,500 Å hardly contribute to providing any catalytic activity for the decomposition of toluene insolubles, but are only concerned with the crushing strength of the catalyst. Therefore, it is desirable to minimize such macropores.

The carrier may be prepared, for example, by pulverizing a treated or non-treated clay mineral, kneading the clay mineral with a controlled amount of water to form a paste, molding the paste followed by drying and calcining.

The catalytic hydrotreatment of this invention may be carried out by any ordinary flow system, such as a fixed, moving, fluidized or ebullated bed, without causing any catalyst to be carried out of the reaction zone with the reaction product, if the shape of the catalyst, etc. are properly selected. The reactant may be fed into the reaction zone through the top or bottom of the reactor. In other words, the flow of the gas and the liquid in the reactor may be co-current upwardly or downwardly. The catalyst particles may be granular, spherical or cylindrical, but for the hydrotreatment of a cracking product of a heavy hydrocarbon oil containing large quantities of asphaltenes and heavy metals, it is desirable to use extrudate catalyst particles which are hollow cylindrical, non-circular in cross section, e.g., oval, tri-lobed or multi-leafed, or elongated and have a surface provided with at least one groove. When these specially shaped particles are used to form a fixed bed, they increase the voids in the reactor, and it is not only possible to reduce the pressure drop in the catalyst bed, but the blocking of the catalyst bed by deposition of coke and metal among the catalyst particles can also be prevented remarkably.

The conditions for the hydrotreatment according to this invention include a temperature of 350° C. to 450° C., preferably 370° C. to 430° C., a hydrogen pressure of 50 to 250 atm., preferably 80 to 200 atm., and a liquid space velocity of 0.1 to 5 hours$^{-1}$, preferably 0.2 to 3 hours$^{-1}$.

If the reaction temperature is below 350° C., the catalyst fails to show its full activity, and the reaction and conversion ratio in the hydrotreating process fails to reach any practically acceptable level. If it exceeds 450° C. on the other hand, asphaltenes undergo polycondensation, and tend to increase, rather than decrease. Moreover, coking occurs more actively, thereby causing degradation of the product, reduction in the activity of the catalyst and agglomeration of catalyst particles. If the hydrogen pressure is below 50 atm., coking occurs so actively that it is very difficult to maintain the activity of the catalyst at a normal level. Any hydrogen pressure in excess of 250 atm. brings about too active hydrocracking, and is not practically acceptable from the economical standpoint, since there result an increased hydrogen consumption, a reduced yield of production, and an increased cost of the reactor and other associated equipment. If the liquid space velocity is less than 0.1 hour$^{-1}$, a prolonged process time for oil brings about degradation of the product due to the thermal change of its heavy components, while any velocity in excess of 5 hours$^{-1}$ brings about a lower reaction and conversion ratio per pass which is practically unacceptable.

The proportion of hydrogen or a gas containing hydrogen to cracking product to be fed into the reaction zone may be 100 to 2,000 volumes of hydrogen at 15° C. per volume of the product at 1 atm. and 15° C. (i.e., 100 to 2,000 Nl/l), preferably 500 to 1,000 Nl/l. If it is less than 100 Nl/l, the reaction zone becomes short of hydrogen, no sufficient hydrogen is fed into the liquid, resulting in coking, which has an adverse effect on the properties of the catalyst and the oil to be produced. Any proportion in excess of 2,000 Nl/l does not provide any additional benefit in the process of this invention, though it does not present any problem in the reaction. The cost of a compressor used for circulating hydrogen depends on the quantity of the hydrogen to be circulated, and is very high for supplying hydrogen in excess of 2,000 Nl/l. Thus, the quantity of 2,000 Nl/l may be a practical upper limit to the circulation of hydrogen. The gas which is rich in hydrogen and circulated through the reaction zone may contain hydrogen sulfide. It does not have any adverse effect, but even tends to promote the reaction if its quantity is appropriate. The catalyst used for the purpose of this invention has some interaction with hydrogen sulfide under the aforementioned conditions for the reaction, and hydrogen sulfide plays a certain role in maintaining the activity of the catalyst. The hydrogen to be fed into the reaction zone can contain up to 10 mol % of hydrogen sulfide within the scope of this invention.

The reaction product obtained by the hydrotreating process under the aforementioned conditions, and not containing any catalyst is delivered to a gas-liquid separation zone, where it is separated into a gas which is rich in hydrogen, and a product consisting substantially solely of a liquid. Any method and apparatus used in an ordinary desulfurization process with a fixed or ebullated bed may be employed for the gas-liquid separation.

The thus separated hydrogen-rich gas may be recycled to the thermal cracking stage or hydrotreating stage. In an alternative, the hydrogen-rich gas may be used for quenching the product from the thermal cracking stage. When the feedstock heavy hydrocarbon oil contains a large amount of asphaltenes and metals, it is advantageous to separate the liquid product obtained by the gas-liquid separation into a substantially asphaltene-free and heavy metal-free light oil fraction and a heavy fraction containing asphaltenes and heavy metals, the heavy fraction being recycled to the thermal cracking or hydrotreating stage. According to this process, it is possible to convert the feedstock oil containing a large quantity of asphaltenes continuously to a light hydrocarbon oil not containing asphaltenes or heavy metals. With such a recycling treatment, the hydrogen and catalyst consumption may remarkably decrease and the yield of the light hydrocarbon oil may significantly increase. The separation of the liquid product into such light and heavy fractions can be accomplished by any ordinary method, such as distillation and solvent deasphalting. If the separation is conducted by solvent deasphalting, it is possible to use as a solvent at least one low molecular hydrocarbon, such as methane, ethane, propane, butane, isobutane, pentane, isopentane, neopentane, hexane and isohexane. The solvent and the liquid reaction product are brought into counter-current contact with each other. Solvent deasphalting may be carried out at a temperature of 10° to 250° C., preferably 50° to 150° C., and a pressure of 3 to 100 atm., preferably 10 to 50 atm.

According to the hydrotreatment employing the catalyst of this invention, it is possible to obtain a light hydrocarbon oil having improved quality without encountering the problem of catalyst poisoning. The hydrocarbon contained in the hydrotreatment product obtained according to this invention has a molecular weight of about 200 to about 2,000. The asphaltenes remaining to a slight extent in the hydrotreatment product have a considerably lower molecular weight than that in the thermal cracking product, and contain sharply reduced quantities of sulfur and heavy metals. A greater proportion of the sulfur and nitrogen in the hydrotreatment product is present in its light fraction, as opposed to their distribution in the cracking product. Moreover, the oil obtained has been found to have unique properties differing from those of the product obtained by any known method, irrespective of the type of the product from the thermal cracking stage. In the process of this invention using the catalyst with the specific pore characteristics, even if the thermal cracking stage is conducted under severe conditions so as to obtain as much light hydrocarbon oils as possible, the hydrotreated oil produced in the subsequent catalytic hydrotreating stage are excellent in stability and compatibility. Also, oil products obtained by further processing of the hydrotreated oil have good stability and compatibility. Residues derived from the hydrotreated oil, for example, are very suited as materials for heavy fuel oils because of their good compatibility with light oils of any sort. Such fuel oils are stable and do not give rise to a problem of sludge formation during storage.

The hydrotreating stage in the process of this invention may be carried out in two-step manner. The two-step hydrotreatment comprises the steps of:

(i) bringing a cracking product from thermal cracking stage into contact with the above-described catalyst at a temperature of 350° to 450° C., a hydrogen pressure of 50 to 250 atm. and a liquid space velocity of 0.1 to 5.0 hours$^{-1}$; and (ii) at a temperature of 350° to 450° C., a hydrogen pressure of 50 to 250 atm. and a liquid space velocity of 0.1 to 5.0 hours$^{-1}$, bringing at least a portion of the product of step (a) into contact with a catalyst which comprises a porous carrier containing alumina and having composited therewith a first catalytic metal component composed of at least one compound selected from among the oxides and sulfides of the metals belonging to Group VIB of the Periodic Table and a second catalytic metal component composed of at least one compound selected from among the oxides and sulfides of the metals belonging to Group VIII of the Periodic Table, and which catalyst has, with regard to its pores having a diameter of 75 Å or more, the properties: an average pore diameter of about 80 Å to about 200 Å, a pore volume of about 0.4 cc/g to about 1.5 cc/g, and a surface area of about 100 m$^2$/g to about 400 m$^2$/g.

The carrier for the catalyst used in step (ii) supports thereon a combination of at least one compound selected from among the oxides and sulfides of the metals belonging to Group VIB of the Periodic Table, and at least one compound selected from among the oxides and sulfides of the metals belonging to Group VIII of the Periodic Table. This combination is preferably a combination of at least one selected from the oxides and sulfides of chromium, molybdenum and tungsten, and at least one selected from among those of cobalt and nickel. The metal component preferably contains about 2 to 40% by weight of the compound of the metal belonging to Group VIB, and about 0.1 to 10% by weight of the compound of the metal belonging to Group VIII, both in terms of the weight of the oxide, based on the total weight of the catalyst.

Step (ii) is intended for removing sulfur, nitrogen, Conradson carbon residue and residual metal and for minimizing unsaturated components by hydrogenation. The selection and combination of the metal components depend on the reaction on which the upmost importance should be placed on a case to case basis. In order to promote the activity for denitrification and reduction of Conradson carbon residue, too, it is desirable to add as an auxiliary catalyst component at least one of the compounds of titanium, boron, phosphorous and fluorine, or boron phosphate, or boron fluoride. In this case, the catalyst can effectively contain about 1.0 to 30% by weight of any such auxiliary component, in terms of oxide, based on the total weight of the catalyst.

The catalyst employed for step (ii) may be prepared by any known method, if there can be obtained a catalyst having a desired porous structure, particularly an average pore diameter of about 80 Å to 200 Å, a pore volume of about 0.4 to 1.5 cc/g and a surface area of about 100 to 400 m$^2$/g. The method and conditions of the treatment for step (ii), and the particle diameter and shape of the catalyst to be employed therein may be equal to those already described in connection with the hydrotreatment using the catalyst of this invention.

The carrier for the catalyst used for step (ii) is a carrier containing at least 70% by weight of alumina, and preferably composed of alumina alone, or silica-alumina.

A process including the two-step hydrotreating process is a superior process which can be utilized for converting substantially the whole quantity of the heavy feedstock to a high quality desulfurized oil, even if it is required to treat a heavy oil containing still larger quantities of asphaltenes and heavy metals, or even if it is required to conform to very stringent specifications for the product to be obtained. The industrially advantageous two-step treatment of any such heavy oil may be carried out by physically separating a heavy fraction containing asphaltenes or heavy metals from the product of the first step, and recycling it to the first step, or alternatively, by physically separating such a heavy fraction from the product of the second step and recycling it to the first and/or second step or the thermal cracking stage. The step of separating the light and heavy fractions does not require any special method, but may be effected by distillation, solvent deasphalting, or any other ordinary method.

As already pointed out, the two-step hydrotreating process of this invention produces a product oil having a high added value. The product oil, which contains reduced quantities of nitrogen and Conradson carbon residue, is an optimum stock for preparing high grade gasoline by catalytic cracking, or kerosene, jet fuel oil and diesel oil by hydrocracking.

One of the preferred embodiments of this invention will be described below with reference to FIG. 1. A heavy hydrocarbon feedstock is supplied through a line 1 and mixed with a hydrogen-rich gas supplied through a line 10. The mixture is introduced through a line 2 into a thermal cracking zone 3 where the mixture undergoes thermal cracking. The product of the thermal cracking is withdrawn from the cracking zone 3 through a line 4 and is cooled by direct contact with a hydrogen gas supplied from a line 5. The mixture of the product and the hydrogen gas is then introduced into a hydrotreating zone 7 through a line 6, where the cracking product is subjected to hydrotreating conditions. The hydrotreatment product is withdrawn from the zone 7 and is fed through a line 8 to a gas-liquid separating zone 9 where the product is separated into a hydrogen-rich gas and a liquid product. The hydrogen-rich gas is recycled through the line 10 to the thermal cracking zone 3. The liquid product is taken through a line 11 for recovery as an end product or for introduction into further treating steps.

The following examples will further illustrate the present invention.

EXAMPLE 1

A vacuum residue of Khafji crude oil was employed as a heavy hydrocarbon feedstock oil and was treated in accordance with the process of this invention for continuous conversion thereof into light hydrocarbon oils. The feedstock oil had the properties summarized in Table 2.

TABLE 2

| Properties of Feedstock | |
|---|---|
| Gravity (°API) | 6.8 |
| Specific gravity (D 15/4° C.) | 1.0233 |
| Viscosity (50° C., cp) | 300,000 |
| (100° C., cp) | 2,320 |
| n-Heptane insolubles (wt %)* | 9.7 |
| Sulfur content (wt %) | 4.59 |
| Vanadium content (wt-ppm) | 147 |
| Nickel content (wt-ppm) | 49 |
| Nitrogen content (wt %) | 0.45 |
| Conradson carbon residue (wt %) | 21.8 |
| Distillation inspection | |
| <650° F. (vol %) | 0.7 |

TABLE 2-continued

| Properties of Feedstock | |
|---|---|
| 650–900° F. (vol %) | 4.3 |
| >900° F. (vol %) | 95.0 |

*In the present specification, the percentages of n-heptan insolubles are determined by n-heptane extraction at 80° C. in accordance with UOP Method 614-80.

The feedstock oil was continuously fed at a flow rate of 500 cc/hr and was mixed with a hydrogen-rich gas of 300 Nl/hr so that the mixture had a hydrogen to oil ratio of 600 Nl/l. The feed of the mixture was preheated to 350° C. in a heater and fed to a thermal cracking zone which included a coil tube reactor placed in a fluid bath heater. The tube had an inner diameter of 7 mm and a length of 2.2 m. The heater was operated so that the temperature within the tube at its outlet was maintained at 485° C. The pressure within the tube was controlled to be 140 Kg/cm$^2$G by means of a control valve provided in a line extending from a hydrotreating zone provided downstream of the cracking zone. The residence time within the thermal cracking zone was about 5.7 min.

The reaction mixture containing the cracked product was continuously discharged from the cracking zone and was rapidly cooled, before being introduced into the hydrotreating zone, to 408° C. by direct contact with a pure hydrogen gas supplied at a flow rate of about 200 Nl/hr. Additional hydrogen was also fed directly to the hydrotreating zone so that the total feed rate of hydrogen introduced thereinto was about 1000 Nl/hr. The hydrotreating zone included an isothermal, fixed bed reactor packed with a catalyst through which reactant streams were flown co-currently downward. The catalyst was formed of a Spanish sepiolite carrier composited with Co and Mo and was prepared by way of the following method.

About 15 Kg of Spanish sepiolite having a grain size of 5–20 mesh and the composition shown below were placed in a vessel equipped with an agitator and washed with 150 l of ion-exchanged water having a pH value of 6.5 by agitation.
SiO$_2$: 50.3 wt %
MgO: 20.3
Al$_2$O$_3$: 4.2
Fe$_2$O$_3$: 0.7
FeO: 0.2
CaO: 1.5
Na$_2$O: 0.4
K$_2$O: 1.1

Thereafter, an upper, colloidal portion of the mixture in the vessel was separated by decantation to leave a solids-rich phase. The amount of the sepiolite in the separated colloidal portion was about 25 wt % of the starting material sepiolite. The sepiolite in the solids-rich phase was found to contain about 70 wt % of highly crystalline sepiolite. The solids-rich phase was dried at 120° C. for 7 hours and the thus dried sepicilite was then ground until sepiclite particles with a grain size of 48 mesh or finer occupied 95 wt %. After removal of particles with a grain size coarser than 48 mesh by means of a sieve, the ground sepiolite was mixed with 170 wt % of water to obtain a paste. The paste was extruded six times in total through a die for kneading, thereby obtaining a columnar extrudate having 1.6 mm diameter. After being dried at 120° C. for 7 hours, the extrudate was precalcined at 500° C. On the precalcined sepiolite were then supported cobalt and molybdenum by way of an impregnation method. The resulting sepiolite was dried at 120° C. for 6 hours and calcined at 500° C. for 3 hours, thereby to obtain a sepiolite catalyst, whose properties were as shown in Table 3 below.

TABLE 3

| Properties of Catalyst | |
|---|---|
| Composition (wt %) | |
| CoO | 2.0 |
| MoO$_3$ | 5.8 |
| Al$_2$O$_3$ | 5.8 |
| SiO$_2$ | 52.6 |
| MgO | 20.9 |
| Average catalyst diameter (mm) | 1.2 |
| Pore volume (cc/g) | |
| 75–100 Å | 0.02 |
| 100–200 Å | 0.12 |
| 200–400 Å | 0.40 |
| 400–500 Å | 0.13 |
| 500–1500 Å | 0.07 |
| above 1500 Å | 0.01 |
| Total | 0.75 |
| Specific surface area (m$^2$/g) | 110 |
| Average pore diameter (Å) | 270 |
| Packed catalyst density (g/cc) | 0.47 |
| Crushing strength (Kg/mm) | 2.5 |

The hydrotreatment was performed at a temperature of 405° C., a pressure of 140 Kg/cm$^2$G and a liquid hourly space velocity of 0.33 hr$^{-1}$ using a hydrogen to oil ratio of 1000 Nl/l.

The product obtained by the hydrotreatment was successively withdrawn from the hydrotreating zone and was fed to a gas-liquid separating zone for separation thereof into a hydrogen-rich gas and a liquid product. The separation was carried out at a temperature of 150° C. and the same pressure as in the hydrotreatment step. The hydrogen-rich gas was recycled to the thermal cracking zone after the removal of its impurities such as hydrogen sulfide and ammonia by washing. A portion of the recycling gas was diverted out of the system so as to maintain the concentration of a light hydrocarbon gas in the recycling gas below a predetermined level. The liquid product was, after being released of its pressure, introduced into another gas-liquid separating device where it was separated into a cracked gas and a product oil. The gas was weighed by a gas meter while the product oil was collected in a tank and weighed by means of a weighing cell. The yield of the cracked gas (C$_1$–C$_4$) and the product oil (C$_5$+) at about 1000 hours process time were found to be 5.1 wt % and 94.1 wt %, respectively. The consumption of hydrogen was about 800 SCF/BBL. The properties and the results of distillation inspection of the product oil at about 1000 hours process time are shown in Tables 5 and 6, respectively. Tests were also conducted to evaluate the stability and compatibility of the product oil in accordance with ASTM D 1661 and 2781. The test procedures are briefly summarized below.

Thermal Stability Test (ASTM D 1661):

The test sample, circulated by thermosiphon action through a glass apparatus, is in contact for 6 hours with the surface of a steel thimble containing a sheathed heating element. The sample is heated on the hot surface of the steel thimble in a heater chamber, flows upward through a riser tube, then descends in a connecting tube and returns to the heater chamber for recirculation. The temperature between the sheathed heating element and the thimble in the heater chamber is maintained at 350° F. (177° C.). At the end of the test period, the thimble is removed and examined for sediment formation and discoloration on the surface. The thermal stability is rated in accordance with the following thimble ratings:

| Rating | Thimble Sections | | |
|---|---|---|---|
| | Unwashed | Unwiped, Washed | Wiped, Washed |
| Stable | Clean oil film | Metal bright | Metal bright |
| Borderline | Heavily peppered oil film | Thin carbon layer | Slightly darkened |
| Unstable | Film of asphaltic smear | Definite black carbon film | Definite discoloration |

Compatibility Test (ASTM D 2781):

Equal volumes of the test sample and the distillate fuel oil are blended. A drop of the blend is allowed to spread on chromatographic paper of a specified grade. The spot thus formed is compared with a series of numbered reference spots. The compatibility of the sample is rated on the basis of this comparison and is represented by reference spot number. Larger spot number designates poor compatibility.

| Reference Spot No. | Characterizing Feature |
|---|---|
| 1 | Homogeneous spot (no inner ring) |
| 2 | Faint inner ring |
| 3 | Thin inner ring slightly darker than background |
| 4 | Inner ring somewhat darker than background |
| 5 | Nearly solid area in the center |

It has been confirmed that the two-stage process of the above Example can be continuously operated for more than 4000 hours without encountering a problem of blockage of the hydrotreating zone and can produce, at about 4000 hours process time, a hydrotreated product oil having almost the same properties as that at 1000 hours process time.

COMPARATIVE EXAMPLE 1

Example 1 was repeated without the catalytic hydrotreatment. Thus, the feedstock oil used in Example 1 was subjected to the thermal cracking treatment alone and the cracked oil was directly introduced into the gas-liquid separator without undergoing the catalytic hydrotreatment. The properties and the results of the distillation inspection of the resulting product oil at about 1000 hours process time were as shown in Tables 5 and 6.

COMPARATIVE EXAMPLE 2

Example 1 was repeated without the thermal cracking treatment. Thus, the feedstock oil used in Example 1 was subjected to the catalytic hydrotreatment followed by gas-liquid separation. The properties and the results of the distillation inspection of the resulting product oil at about 1000 hours process time were as shown in Tables 5 and 6.

COMPARATIVE EXAMPLE 3

Example 1 was repeated using a catalyst having the composition and the properties shown in Table 4 in place of the sepiolite catalyst. The properties of the product oil at about 1000 hours process time are shown in Table 5 together with the test results with respect to its stability and compatibility. After about 1000 hours from the commencement of the operation, the catalyst layer at the inlet portion of the hydrotreating zone was clogged due to coking so that the operation could not be continued any longer.

TABLE 4

| Properties of Catalyst | |
|---|---|
| Composition (wt %) | |
| CoO | 4.1 |
| $MoO_3$ | 15.0 |
| $Al_2O_3$ | 78.4 |
| Average Catalyst Diameter (mm) | 1.2 |
| Pore Volume (cc/g) | |
| 75–100 Å | 0.02 |
| 100–200 Å | 0.53 |
| 200–400 Å | 0.01 |
| 400–1500 Å | 0.01 |
| 1500 Å < | 0 |
| Total | 0.56 |
| Specific Surface Area (m²/g) | 150 |
| Average Pore Diameter (Å) | 150 |
| Packed Catalyst Density (g/cc) | 0.66 |
| Crushing Strength (Kg/mm) | 0.9 |

TABLE 5

| Properties of Light Hydrocarbon Product | | | | |
|---|---|---|---|---|
| | Example | Comparative Example | | |
| | 1 | 1 | 2 | 3 |
| Gravity (°API) | 11.8 | 10.2 | 13.2 | |
| Specific Gravity (d 15/4° C.) | 0.9871 | 0.9985 | 0.9776 | |
| Viscosity | | | | |
| (50° C., cp) | 190 | 460 | 715 | |
| (100° C., cp) | 23 | 40 | 58 | |
| Sulfur Content (wt %) | 2.45 | 4.50 | 2.71 | |
| Vanadium Content (wt-ppm) | 28 | 145 | 21 | |
| Nickel Content (wt-ppm) | 24 | 49 | 15 | |
| Nitrogen Content (wt %) | 0.49 | 0.60 | 0.33 | |
| Conradson Carbon Residue (wt %) | 17.5 | 25.0 | 15.0 | |
| Toluene Insolubles (wt %) | Trace | 3.9 | Trace | 0.8 |
| Conversion* (vol %) | 50 | 35 | 18 | |
| Thermal Stability | Stable | Unstable | Stable | Unstable |
| Compatibility | No. 1 | | | No. 5 |

* $\dfrac{A - B}{A} \times 100\%$

A: Volume of components heavier than 900° F. in the feedstock oil
B: Volume of components heavier than 900° F. in the product oil

TABLE 6

| Distillation Inspection | | | |
|---|---|---|---|
| | Example 1 | Comparative Example 1 | Comparative Example 2 |
| Gas (wt %) | 5.1 | 3.3 | 2.0 |
| <375° F. (vol %) | 9.1 | 8.6 | 0.5 |
| 375–650° F. (vol %) | 20.5 | 16.7 | 7.0 |
| 650–900° F. (vol %) | 27.7 | 19.9 | 15.6 |
| >900° F. (vol %) | 42.9 | 53.9 | 77.5 |

From the above results, it will be apparent that the two-stage process according to the present invention gives high quality product oil with higher conversion as compared with the case where thermal cracking and catalytic hydrotreatment are effected singly (Comparative Examples 1 and 2). Further, the process according to the present invention can give stable product oil with excellent compatibility for a long period of time. On the other hand, with the alumina catalyst, the hydrotreatment cannot be continued for a long period of time and the product oil is unstable and poor in compatibility (Comparative Example 3).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A process for the conversion of a heavy hydrocarbon oil into light hydrocarbon oils, comprising thermally cracking a heavy hydrocarbon oil containing at least 10 vol % of fractions having a boiling point of at least 900° F. to convert at least about 15 vol % of said fractions having a boiling point of at least 900° F. into light hydrocarbon oils having a boiling point of below 900° F., said thermal cracking being carried out at a temperature of 400° to 530° C. and a pressure of 0 to 200 Kg/cm$^2$G with a residence time of 1 min. to 5 hours, the product of the thermal cracking containing toluene insolubles, and hydrotreating the toluene insolubles-containing product of the thermal cracking as such at a temperature of 350°–450° C., a hydrogen pressure of 50 to 250 Kg/cm$^2$G, a liquid space velocity of 0.1 to 5 Hrs$^{-1}$ and a hydrogen to oil feed rate of 100 to 2000 Nl/l add in the pressure of a catalyst which comprises:

a porous-carrier comprising a clay mineral consisting essentially of magnesium silicate having a double-chain structure, and one or more catalytic metal components composited with said carrier, the metal of said catalytic metal components being selected from the group consisting of the metals belonging to Groups VB, VIB, VIII and IB of the Periodic Table, said catalytic metal components being present in an amount of between about 0.1% and about 30% in terms of metal oxide based on the total weight of said catalyst, said catalyst further having the following characteristics (1)–(4):

(1) an average pore diameter being between about 200 and about 400 Å, (2) a total volume of pores with a pore diameter of 75 Å or more being between about 0.5 and about 1.5 cc/g, the volume of pores with a diameter of not greater than 100 Å being not more than 0.1 cc/g, the volume of pores with a diameter of between about 200 and about 400 Å being at least about 0.2 cc/g, the volume of pores with a diameter of at least 1500 Å being not greater than about 0.03 cc/g, (3) a total surface area of pores with a pore diameter of 75 Å or more being at least about 70 m$^2$/g, (4) an average catalyst diameter being between about 0.6 and about 5 mm, whereby a hydrotreated product having a toluene insolubles content of no more than 0.5 wt % is obtained.

2. A process for the conversion of a heavy hydrocarbon oil into light hydrocarbon oils, comprising (a) thermally cracking a heavy hydrocarbon oil containing at least 10 vol. % of fractions having a boiling point of at least 900° F. to convert at least about 15 vol. % of said fractions having a boiling point of at least 900° F. into light hydrocarbon oils having a boiling point of below 900° F., said thermal cracking being carried out at a temperature of 400° to 530° C. and a pressure of 0 to 200 Kg/cm$^2$G with a residence time of 1 min. to 5 hours, the product of the thermal cracking containing toluene insolubles, (b) removing low boiling fractions from the toluene insolubles-containing product of the thermal cracking step (a) by distillation, and (c) hydrotreating the product from step (b) from which low boiling fractions have been removed at a temperature of 350° to 450° C., a hydrogen pressure of 50 to 250 kg/cm$^2$G, a liquid space velocity of 0.1 to 5 Hrs$^{-1}$ and a hydrogen to oil feed rate of 100 to 2000 Nl/l and in the presence of a catalyst which comprises:

a porous carrier comprising a clay mineral consisting essentially of magnesium silicate having a double chain structure, and one or more catalytic metal components composited with said carrier, the metal of said catalytic metal components being selected from the group consisting of the metals belonging to Groups VB, VIB, VIII and IB of the Periodic Table, said catalytic metal components being present in an amount of between 0.1% and about 30% in terms of metal oxide based on the total weight of said catalyst, said catalyst further having the following characteristics (1)–(4):

(1) an average pore diameter being between about 200 and about 400 Å, (2) a total volume of pores with a pore diameter of 75Å or more being between about 0.5 and about 1.5 cc/g, the volume of pores with a diameter of not greater than 100 Å being not more than 0.1 cc/g, the volume of pores with a diameter of between about 200 and about 400 Å being at least about 0.2 cc/g, the volume of pores with a diameter of at least 1500 Å being not greater than about 0.03 cc/g, (3) a total surface area of pores with a pore diameter of 75 Å or more being at least about 70 m$^2$/g, (4) an average catalyst diameter being between about 0.6 and about 5 mm, whereby a hydrotreated product having a toluene insolubles content of no more than 0.5 wt % is obtained.

3. A process as set forth in claim 1 or claim 2, wherein said thermal cracking is conducted in the presence of a gaseous medium selected from the group consisting of steam, hydrogen and nitrogen.

4. A process as set forth in claim 1 or claim 2, wherein said thermal cracking is conducted in the presence of a hydrogen-rich gas which is obtained by separating said hydrotreated product into a hydrogen-rich gas and a liquid product and recycling said hydrogen-rich gas to the thermal cracking step.

5. A process as set forth in claim 1 or claim 2, wherein said clay mineral is selected from the group consisting of sepiolite, attapulgite, palygorskite and mixtures thereof.

6. A process as set forth in claim 1 or claim 2, wherein the metal of said one or more catalytic metal components is at least one member selected from the group consisting of vanadium, chromium, molybdenum, tungsten, cobalt, nickel and copper, said catalytic metal components being in the form of an elemental metal, an oxide, a sulfide or a mixture thereof.

7. A process as set forth in claim 1 or claim 2, further comprising reacting at least a part of the hydrotreated product with hydrogen at a temperature of between 350° and 450° C., a hydrogen pressure of between 50 and 250 atm. and a liquid space velocity of between 0.1 and 5.0 hours$^{-1}$ in the presence of a catalyst including a porous carrier containing alumina and having composited therewith a combination of first and second catalytic metal components, the metal of said first catalytic metal component being at least one member selected from the group consisting of the metals belonging to Group VIB of the Periodic Table, the metal of said second catalytic metal component being at least one member selected from the group consisting of the metals belonging to Group VIII of the Periodic Table, said catalyst having, with regard to its pores with a diameter of 75 Å or more, the properties of: an average pore diameter being between about 80 and about 200 Å, a total pore volume being between about 0.4 and about 1.5 cc/g, and a total surface area being between about 100 and about 400 m$^2$/g.

8. A process as set forth in claim 1 or claim 2, wherein thermal cracking is performed while substantially precluding the feed or hydrogen sulfide gas to the cracking zone.

* * * * *